United States Patent Office 3,309,317
Patented Mar. 14, 1967

3,309,317
LUBRICATING COMPOSITION
Eugene Wittner, Florissant, Mo., and Bobby W. Malone, East Alton, Ill., assignors to Shell Oil Company, New York, N.Y., a corporation of Delaware
No Drawing. Filed June 8, 1964, Ser. No. 373,512
3 Claims. (Cl. 252—49.9)

This invention relates to stable lubricating oil compositions which possess excellent detergent as well as wear and corrosion resistant properties.

It is known that a wide variety of oil-soluble nitrogen-containing polymers are useful as detergents in lubricating compositions. Polymers of this type such as copolymers of long-chain alkyl acrylates and polymerizable compounds containing basic amino or amido or imidoamino groups such as copolymers of $C_{10-18}$ alkyl methacrylates and vinyl pyridine or vinyl pyrrolidone or poly(alkenyl)succinic anhydride-polyalkylene polyamine reaction products and the like, function effectively as detergents for only short durations when used in engines operating for long periods under severe temperatures and pressures. Under such conditions they tend to break down, lose their detergent properties and form sludge, and cause corrosion and wear of engine parts. Attempts to improve these non-ash forming polymeric detergents by modifying them or by addition of auxiliary agents such as organic phosphate esters or salts thereof, bisphenols or thiophenols has resulted in some improvement particularly when such lubricants are used in engines operating for short durations under mild conditions of temperature and pressure. However, under severe engine operating conditions over long periods of use these classes of inhibitors or even other types such as arylamines, organic thiophosphates and the like, fail to improve non-ashforming polymeric detergent-containing lubricants so as to meet required standards of 6000 mile drains and various specification requirements.

It is an object of the present invention to provide an improved non-ash forming lubricating oil composition. It is another object of the invention to provide an improved detergent lubricant possessing good stability and anti-wear properties. Still another object of the invention is to provide a corrosion resistant non-ash forming lubricating oil composition. Other objects will become apparent during the following description of the invention.

It has now been found that compounded lubricants containing ash-less nitrogen-containing polymeric detergents can be greatly improved with respect to increased detergent life, stability and sludge, corrosion, and wear inhibition by incorporating therein minor amounts each of (I) an oil-soluble alkaryl phosphoramide having the formula

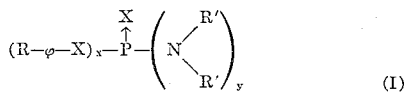

(I)

where R is an alkyl radical of from 1 to 18 carbon atoms, preferably 4–14 carbon atoms, R' is hydrogen, or a hydrocarbyl radical e.g. alkyl, aryl, cycloalkyl radical, X is oxygen or sulfur, $\varphi$ is a mono or polyaryl radical and $x$ and $y$ each represent integers the sum of which is 3 and preferably such that $x$ is 2 and $y$ is 1, and (II) an oil-soluble diaryl compound represented by the formula

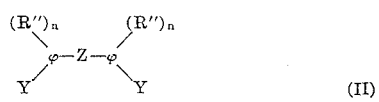

(II)

where $\varphi$ is a mono- or polyaryl radical e.g. phenyl or naphthyl radical, R'' is a $C_{4-8}$ alkyl radical, Y is —OH or

where R' is the same as in Formula I, Z is —$CH_2$—, —O—, or —S— and $n$ is an integer of from zero to 2 and is preferably 2 when Y is —OH and zero when Y is

Preferred class of compounds are oil-soluble bisphenols represented by formula

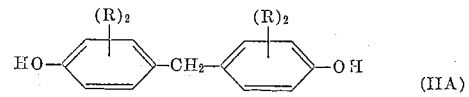

(IIA)

where the R's are $C_4$-$C_8$ tertiary alkyl groups preferably in the 2,6, 2',6' positions and (IIB) an oil-soluble polyaryl polyamine represented by the formula:

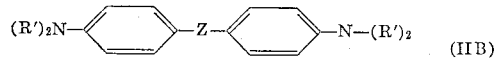

(IIB)

where Z is oxygen, sulfur, or a methylene radical and R' is hydrogen or a $C_{1-8}$ alkyl radical such as methyl, ethyl, propyl, isopropyl, butyl, isobutyl, t-butyl, amyl, hexyl, octyl, radicals or mixtures thereof.

The alkaryl phosphoramides as represented by formula (I) and preferably by formulas

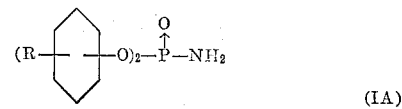

(IA)

or

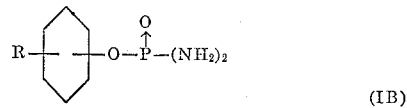

(IB)

where R is the same as defined in Formula I, can be prepared by any suitable means such as are described in chapter 10 of Kosolapoff's text entitled, "Organo Phosphorus Compounds." A specific illustrative example for the preparation of such a compound is as follows:

*Example A.—Bis(nonylphenyl)phosphoramidate*

A solution of 104.1 g. (0.2 mole) of bis(nonylphenyl)-phosphorochloridate in 300 ml. of benzene was placed in a 1-liter flask equipped with a mechanical stirrer, a thermometer, a reflux condenser and a gas inlet tube. The mixture was stirred and cooled to 5° C. in an ice bath. Gaseous ammonia was admitted to the flask above the liquid level (to avoid plugging the gas inlet with precipitated ammonium chloride). The mixture was stirred and cooled and the rate of the addition of ammonia was controlled so that the pot temperature remained below 15° C. When no more ammonia was absorbed, the addition of ammonia was discontinued and the reaction mixture was refluxed for one hour. The flask contents were cooled, the precipitate was removed by filtration using Celite filter aid, the filtrate was washed three times with water and the benzene solution was dried over anhydrous magnesium sulfate. The benzene was removed under vacuum and the residue was topped at ca 100° C. and 1 mm. Hg until the last traces of solvent were eliminated. A total of 85 g. of product (85% w. of theory), a very viscous yellow oil, was obtained.

Found, percent weight: C, 71.3; H, 9.83; P, 6.22; N, 2.35. Mol. wt., 600. Calculated for $C_{30}H_{48}O_3NP$, percent weight: C, 71.8; H, 9.67; P, 6.18; N, 2.79. Mol. wt., 501.

Other examples of phosphoramides prepared essentially by the method described include:

Example B: Bis(isobutylphenyl)phosphoramide
Example C: Bis(diisobutylphenyl)phosphoramide
Example D: Bis(dodecylphenyl)phosphoramide
Example E: Bis(octadecylphenyl)phosphoramide
Example F: Bis(nonylnaphthyl)phosphoramide
Example G: Bis(nonylphenyl)thionophosphoramide
Example H: Bis(diisobutylphenyl)thionophosphoramide
Example I: Nonylphenylphosphordiamide
Example J: Dodecylphenylphosphordiamide
Example K: Nonylphenylthionophosphordiamide
Example L: N,N'-butyl bis(nonylphenyl)phosphoramide
Example M: N',N-butyl bis(nonylphenyl)thionophosphoramide
Example N: N',N-butylnonylphenylphosphordiamide
Example O: N-isopropyl bis(octylphenyl)phosphoramide
Example P: N-methyl bis(octylphenyl)thionophosphoramide The compounds of Formula II when Z is —$CH_2$— and Y is —OH as represented by the Formula IIA and IIB are illustrated by the following examples: 1,1-bis(3,5-ditertiarybutyl-4-hydroxyphenyl)methane, 1,1-bis(3,5-diisopropoyl - 4-hydroxyphenyl)methane, 1,1-bis(3,5-di-sec-butyl - 4-hydroxyphenyl)methane; 1,1-bis(3-isopropyl-5-tertiarybutyl - 4-hydroxyphenyl)methane; 1,1-bis[3,5-di(2-octyl)-4-hydroxyphenyl]methane; 1,1-bis[3-sec-butyl-5(2-hexyl) - 4-hydroxyphenyl]methane; 1,1-bis(2-tert-butyl-5-methyl-2-hydroxyphenyl)methane and mixtures thereof.

The polyaryl polyamine compounds represented by Formula IIB include (a) bis(N,N-dialkylaminophenyl)-methane and (b) bis(N,N-dialkylaminophenyl)ether or thioether. The compounds of (IIBa) can be prepared by suitable means such as by reacting N,N-dialkyl aniline in an acid medium and adding formaldehyde to the reaction at low temperature of below 40° C. and thereafter allowing the reaction to increase to 60–150° C. for several hours after which the end product is recovered. In the reaction it is preferred that an excess of 40–100% of the amine be used. Thus, bis(N,N-dimethylaminophenyl)methane was prepared by adding 3 moles of N,N-dimethyl aniline and 1 mole of formaldehyde (10% solution) to hydrochloric acid at 60–75° C. and the mixture heated for 1–2 hours after which the end product was recovered. Other examples include: bis(N,N-diethylaminophenyl)methane, bis(N,N-dipropylaminophenyl)methane, bis(N,N-dibutylaminophenyl)methane, bis(N-secondarybutylaminophenyl)methane, bis(N,N-diamylaminophenyl)methane, bis(N,N-dioctylaminophenyl)-methane. The ether or thioethers of (IIBb) include bis-(N,N-dimethylaminophenyl)ether, bis(N,N-dipropylaminophenyl)ether, bis(N-secondarybutylaminophenyl)ether, bis(N,N-dioctylaminophenyl)ether and their thioether derivatives. Preferred compounds are bis(N-secondarybutylaminophenyl)ether and bis(N-secondarybutylaminophenyl)methane.

The detergent polymers which coact with the phosphoramides of Formula I and compounds IIA or IIB or mixture thereof are derived from nitrogen-containing polymerizable monomers containing primary, secondary or tertiary (the latter two are preferred) amino nitrogen, including heterocyclic amino-containing substances, having an ethylenically unsaturated polymerizable group. These detergent polymers may be obtained by polymerizing vinyl substituted heterocyclic amino nitrogen-containing substances such as vinyl pyridine, or polyamines prepared by reducing, in the presence of ammonia or primary or secondary amines, with polymerizable unsaturated alcohols, acids of esters such as acrylate and methacrylates of long-chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals which can be illustrated by: copolymers of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolmers in which the methyl methacrylate is replaced by butyl methacrylate and 2-methyl-5-vinyl pyridine is replaced by 5 - ethyl - 2 - vinyl pyridine. Other suitable polymeric amine detergents are copolymers of $C_{8-18}$ alkyl acrylates, e.g. lauryl methacrylate and aminoalkyl acrylates, e.g. diethylaminoethyl methacrylate. Also suitable are vinyl pyrrolidone-containing polymers or similar copolymers as described in Belgian Patent 550,442 and British Patent 808,664 and mixtures thereof. Acrylate-vinyl pyrrolidone and copolymers are sold by Rohm & Haas under the designations Acryloid 315X or 917 or 966 and are copolymers of N-vinyl pyrrolidone and lauryl methacrylate of varying molecular weights such as 50,000 to over 2 million, preferably between 400,000 and 800,000 as determined by the light scattering method.

Still another class of basic amino nitrogen-containing detergent polymers are polymeric amino-imide-containing detergents such as N-dialkylamino alkyl alkenyl succinimides and illustrated by N-dimethylaminopropyl polybutenyl succinimide, or tetraethylene pentamine derivative of polybutenyl succinic anhydride and the like in the molecular weight range of 1500 to 5,000.

Preferred copolymers having good detergency are: (1) copolymer of 30% stearyl methacrylate, 51% lauryl methacrylate, 14% methyl methacrylate and 5% 2-methyl-5-vinyl pyridine (M.W.=600,000, N=0.02%; (2) copolymer of lauryl methacrylate/stearyl methacrylate/2-methyl-5-vinyl pyridine (M.W.=800,000, N=0.6%); (3) copolymer of lauryl methacrylate/stearyl methacrylate/4-vinyl pyridine (M.W.=600,000, N=0.8%); (4) copolymer of lauryl methacrylate/5 - ethyl - 2 - vinyl pyridine (M.W.=200,000, N=2.8%); (6) copolymer of lauryl methacrylate/vinyl pyrrolidone (M.W.=450,000); (7) imide of diethylene triamine and polybutenyl succinic anhydride; (8) imide of tetraethylene pentamine and mono(polyisobutylene)succinic acid; (9) tetraethylene pentamine diimide of mono(polyisobutylene) succinic acid; (10) imide of tetraethylene pentamine and mono (polypropylene)succinic acid and mixtures thereof. In examples (8) and (9) the polyisobutylene ranged in molecular weight (M.W.) from 1500–3000 and in example (10) the polypropylene ranged in M.W. from 800–1500.

The phosphoramides (I) and the bisphenol (IIA) or polyaryl polyamine (IIB) and the detergent polymers can each be used in concentrations of from about 0.01% to about 10%, preferably between 0.1% and 5% by weight.

When desired, additional improvements can be imparted to the oil compositions containing the polymer salts of this invention by incorporating small amounts (0.01%–2%, preferably 0.1%–1%) arylamines such as phenyl-alpha-naphthylamine, $P_2S_5$-terpene reaction products, sulfurized fatty oils and derivatives thereof, e.g. surfurized sperm oil, sulfurized oleic acid and the like.

Lubricating oils for additives of this invention can be any natural or synthetic material having lubricating properties. Thus, the base may be a hydrocarbon oil of wide viscosity range, e.g. 100 SUS at 100° F. to 150 SUS at 210° F. The hydrocarbon oils may be blended synthetic lubricants such as polymerized olefins, organic esters of organic and inorganic acids, e.g. di-2-ethylhexyl sebacate, pentaerythritol esters of mixed $C_{3-8}$ fatty acids; polyalkyl silicone polymers, e.g. dimethyl silicone polymer, and the like. If desired, the synthetic lubricants may be used as the sole base lubricant.

Mineral lubricating oils which are particularly desirable for use in compositions of this invention were obtained from West Texas Ellenburger crudes, East Texas crudes, Oklahoma crudes, California crudes. A useful refined oil therefrom has the following properties:

| | |
|---|---|
| Gravity, ° API, min. | 26.5 |
| Pour point, ° F., max. | 10 |
| Flash, COC, ° F., min. | 390 |
| Viscosity, SUS at 100° F. | 120–160 |
| Viscosity index, min. | 95 |

Another such oil is a SAE 30 mineral oil having the following properties:

| | |
|---|---|
| Gravity, ° OPI, min. | 24.5 |
| Pour point, ° F., max. | −5 |
| Flash, COC, ° F., min. | 415 |
| Viscosity, SUS at 210° F. | 58–63 |
| Viscosity index | 50–60 |

Preferred compositions of this invention are illustrated by the following examples.

Composition A: Percent wt.
- Copolymer of Ex. 8 _____ 2
- Example A _____ 0.5
- 1,1-bis(3,5-ditertiarybutyl-4-hydroxyphenyl)methane _____ 0.5
- Mineral lubricating oil (HVI SAE 30) _____ Bal.

Composition B:
- Copolymer of Ex. 8 _____ 2
- Example A _____ 0.5
- Bis(N-sec-butylaminophenyl)methane _____ 0.5
- Mineral lubricating oil (HVI SAE 30) _____ Bal.

Composition C:
- Copolymer of Ex. 8 _____ 5
- Example A _____ 0.5
- Bis(N-sec-butylaminophenyl)ether _____ 0.5
- Mineral lubricating oil (HVI SAE 30) _____ Bal.

Composition D:
- Copolymer of Ex. 1 _____ 5
- Example A _____ 0.5
- 1,1-bis(3,5-ditertiarybutyl-4-hydroxyphenyl)methane _____ 0.5
- Mineral lubricating oil (10W–30) _____ Bal.

Composition E:
- Copolymer of Ex. 1 _____ 5
- Example B _____ 0.5
- 1,1-bis(3-5-ditertiarybutyl-4-hydroxyphenyl)methane _____ 0.5
- Mineral lubricating oil (SAE 20) _____ Bal.

Composition F: Percent wt.
- Copolymer of Ex. 8 _____ 2
- Example A _____ 0.5
- 1,1-bis(3,5-ditertiarybutyl-4-hydroxyphenyl)methane _____ 0.75
- Ester base lubricant (95% of dipentaerythritol ester of a mixture of $C_{3-8}$ aliphatic monocarboxylic acids and 5% of pentaerythritol ester of $C_{3-8}$ fatty acid) _____ Bal.

Composition G:
- Copolymer of Ex. 6 _____ 5
- Example I _____ 1
- Bis(N-sec-butylaminophenyl)methane _____ 1
- Ester base lubricant (95% of dipentaerythritol ester of a mixture of $C_{3-8}$ aliphatic monocarboxylic acids and 5% of pentaerythritol ester of $C_{3-8}$ fatty acid) _____ Bal.

The mixtures of phosphoramides and bisphenol or the polyaryl polyamino compounds of this invention are excellent stabilizers as evidenced from the data presented below. In the tests below the effectiveness of lubricants of the present invention for maintaining long dispersant or detergent life was determined by subjecting the test composition to the Air Oxidation test developed by the Shell Development Company to simulate engine operating conditions under which maximum sludge forms and comprises blowing air through the test oil composition at the rate of 5 liters per hour at 300° F. removing samples at regular intervals and determining the dispersant or used detergent life of the oil by the method described in U.S. Patent 2,770,530, and the results shown in Table I were as follows:

TABLE I.—AIR OXIDATION TEST
[300° F., 20 p.p.m. Cu, 20 p.p.m. iron]

| Composition | Induction Period, Hrs. | Oxidation Time, Hrs.[1] | Dispersency Life, Hrs. |
|---|---|---|---|
| (1) Mineral lubricating oil (HVI 100 neutral) | 0 | <3 | <10 |
| (2) Mineral lubricating oil (HVI 100 neutral) plus 0.5% 1,1-bis(3-5-ditertiarybutyl-4-hydroxyphenyl)-methane | 9 | 15 | 18 |
| (3) Mineral lubricating oil (HVI 100 neutral) plus 0.5% 1,1-bis(3,5-ditertiarybutyl-4-hydroxyphenyl)-methane plus 2% copolymer of Ex. 8 | 33 | 38 | 38 |
| (4) Mineral lubricating oil (HVI 100 neutral) plus 0.5% bis(N-sec-butylaminophenyl)-methane | 5 | 11 | 6 |
| (5) Mineral lubricating oil (HVI 100 neutral) plus 0.5% bis(N-sec-butylaminophenyl)-methane plus 2% copolymer of Ex. 8 | 1 | 5 | 10 |
| (6) Composition A | 240 | 240 | 240 |
| (7) Composition B | 240 | 240 | 240 |

[1] Time to absorb 1 millimole $O_2$/gram sample.

Compositions of the present invention also offer excellent corrosion protection as evidenced from the 40 hour CLRL–38 engine test shown in Table II.

TABLE II
[Base oil: HVI SAE 30 + 4% copolymer of Ex. 8]

| Additives: | Cu–Pb bearing wt. loss, mg./hr. |
|---|---|
| (1) None | 75 |
| (2) 0.5% 1,1-bis(3,5-ditertiarybutyl-4-hydroxyphenyl)methane | 22 |
| (3) 0.5% bis(nonylphenyl)phosphoramidate | 100 |
| (4) 0.5% 1,1-bis(3,5-ditertiarybutyl-4-hydroxyphenyl)methane + 0.5% bis(nonylphenyl)phosphoramidate | 6 |

Other additives may also be incorporated into the lubricating composition according to the invention, for example, anti-foaming agents, e.g. silicone polymers; viscosity index improvers, for example, polymeric acrylic esters of the Arcyloid 150 and 710 class; extreme pressure additives, such as dibenzyl disulfide, sulfurized sperm oil, sulfurized oleic acid; oiliness agents, such as acidless tallow, oleic acid and the like.

Compositions of this invention can be used as engine lubricants, hydraulic fluids, industrial lubricants and fuels, greases and the like.

We claim as our invention:

1. A lubricating oil composition comprising a major amount of lubricating oil and from 0.01% to about 10% each of:
   (1) an amino-imide of a mono $C_{20-300}$ polymeric hydrocarbyl succinic anhydride;
   (2) a compound selected from the group consisting of a bis(ditertiaryalkyl - 4 - hydroxyphenyl)methane wherein each of the tertiary alkyl radicals has from 4 to 8 carbon atoms and a bis(N,N-dialkylaminophenyl)methane wherein each of the alkyl radicals has from 1 to 8 carbon atoms; and
   (3) a bis(alkylphenyl)phosphoramide wherein each alkyl radical has from 4 to 14 carbon atoms.

2. A lubricating oil composition comprising a major amount of lubricating oil and from about 0.01% to about 10% each of an oil-soluble polymeric detergent of an amino-imide of a mono $C_{20-300}$ polymeric hydrocarbyl succinic anhydride and a mixture of bis(3,5-ditertiarybutyl-4-hydroxyphenyl)methane and bis(nonylphenyl)phosphoramide.

3. A lubricating oil composition comprising a major amount of lubricating oil and from about 0.01% to about 10% each of an oil-soluble polymeric detergent of an amino-imide of a mono $C_{20-300}$ polymeric hydrocarbyl succinic anhydride and a mixture of bis(N,N-dimethylaminophenyl)methane and bis(nonylphenyl)phosphoramide.

References Cited by the Examiner

UNITED STATES PATENTS

| | | | |
|---|---|---|---|
| 2,146,584 | 2/1939 | Lipkin | 252—49.9 |
| 2,151,380 | 3/1939 | Flint et al. | 252—49.9 |
| 2,290,860 | 7/1942 | Burk et al. | 252—49.9 |
| 2,385,713 | 9/1945 | Kosolapoff | 260—959 |
| 2,944,086 | 7/1960 | Coffield et al. | 252—52 |
| 3,219,666 | 11/1965 | Norman et al. | 242—51.5 |

FOREIGN PATENTS

| | | |
|---|---|---|
| 760,554 | 10/1956 | Great Britain. |
| 808,665 | 2/1959 | Great Britain. |

DANIEL E. WYMAN, *Primary Examiner.*

L. G. XIARHOS, *Assistant Examiner.*